(12) United States Patent
Emami et al.

(10) Patent No.: US 7,346,356 B2
(45) Date of Patent: Mar. 18, 2008

(54) METHOD AND COMMUNICATION UNIT FOR USE IN A WIDEBAND WIRELESS COMMUNICATIONS SYSTEM

(75) Inventors: Shahriar Emami, Royal Palm Beach, FL (US); Celestino A. Corral, Lake Worth, FL (US); Gregg E. Rasor, Lantana, FL (US); Salvador Sibecas, Lake Worth, FL (US); Glafkos Stratis, Lake Worth, FL (US)

(73) Assignee: Motorola, Inc., Schaumburg, IL (US)

( * ) Notice: Subject to any disclaimer, the term of this patent is extended or adjusted under 35 U.S.C. 154(b) by 160 days.

(21) Appl. No.: 10/886,479

(22) Filed: Jul. 7, 2004

(65) Prior Publication Data
US 2006/0009231 A1    Jan. 12, 2006

(51) Int. Cl.
*H04B 1/00*    (2006.01)
*H04B 15/00*   (2006.01)
*H04Q 7/20*    (2006.01)

(52) U.S. Cl. ............................. 455/452.2; 455/452.2; 455/450; 348/470

(58) Field of Classification Search ............... 455/454, 455/552, 226.2, 452.2, 450; 375/260, 133; 348/470
See application file for complete search history.

(56) References Cited

U.S. PATENT DOCUMENTS

| 5,452,009 A * | 9/1995 | Citta ........................... 348/470 |
| 2003/0058923 A1* | 3/2003 | Chen et al. ................. 375/133 |
| 2004/0063412 A1* | 4/2004 | Kim et al. ................ 455/226.2 |
| 2004/0203990 A1* | 10/2004 | De Benedittis ............. 455/522 |
| 2004/0258168 A1* | 12/2004 | Propp et al. ............... 375/260 |
| 2004/0259563 A1* | 12/2004 | Morton et al. ........... 455/452.2 |
| 2005/0003827 A1* | 1/2005 | Whelan ...................... 455/454 |
| 2005/0207505 A1* | 9/2005 | Lakkis ....................... 375/260 |

* cited by examiner

Primary Examiner—Joseph Feild
Assistant Examiner—Michael T. Vu

(57) ABSTRACT

A technique is used in a wideband wireless communication system (100). In some embodiments available channels are determined (310) and one is selected (315) for assignment to each of a set of communication units based on a relative frequency path loss for each available channel. In some embodiments a communication unit is assigned (505) a channel selected from among available channels and a relative signal loss parameter of the communication unit, such as transmit power, is adjusted (510), based on a relative frequency path loss determined from the channel frequency of the assigned channel. In other embodiments, transmit information is split (705) into a plurality of data streams, each characterized by an associated relative signaling sensitivity, and each data stream is assigned (715) to one of a plurality of the transmit channels, wherein data streams are assigned channels of decreasing channel frequencies in order of decreasing associated relative signaling sensitivities of the data streams.

22 Claims, 4 Drawing Sheets

US 7,346,356 B2

METHOD AND COMMUNICATION UNIT FOR USE IN A WIDEBAND WIRELESS COMMUNICATIONS SYSTEM

FIELD OF THE INVENTION

This invention is generally in the field of multi-channel wireless communication systems, and more specifically in the field of wideband wireless communication systems.

BACKGROUND

Communication unit channel assignment is an important issue in communication systems due to the limited radio frequency resources available and growing user demands for information throughput. Many methods of channel assignment are used to select an available channel from a set of available channels and assign it to a communication unit, for which the selection may be based on a variety of factors. Examples of some factors used for channel selection are signal to noise ratio, random number selection, co-channel interference, and channel throughput capacity. The issue exists in wide band, dual band, and ultra wide band systems. An example of a dual band system would be a Local Area Network (LAN) system that is designed to meet two specifications promulgated by the Institute of Electrical and Electronic Engineers, IEEE 802.11a and IEEE 802.11.g. Such a system could assign users channels in a 2.4 GHz band or, for example, a 5.25 GHz band. Different maximum power spectral densities are specified for transmissions in each band. One example of an Ultra Wide Band system is a personal area network that operates in a frequency band from 3.1 GHz to 10.6 GHz. A maximum power spectral density of −41.2 dBm/MHz is specified for transmissions in this band.

BRIEF DESCRIPTION OF THE DRAWINGS

The present invention is illustrated by way of example and not limitation in the accompanying figures, in which like references indicate similar elements, and in which.

Figure 1:
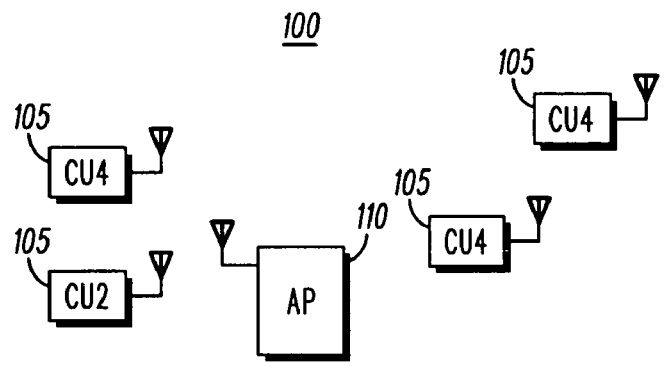
FIG. 1 is a diagram that shows a wideband wireless communication system, in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE DRAWINGS

Before describing in detail the particular wideband communication system in accordance with the present invention, it should be observed that the present invention resides primarily in combinations of method steps and apparatus components related to wideband communication systems having a plurality of channels. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

Consider a wireless communication system where $f_L$, $f_U$ and B are the lower band edge, the upper band edge and width of each channel, respectively. It is well known that a radio signal exhibits more path loss as it travels farther.

In free space, the path loss for a radio signal is given by $$L = 20 \log(4\pi d f/c) \quad (1)$$

where d denotes separation between a transmitter and receiver, f denotes radio carrier frequency, and c denotes the speed of light. The relative free space path loss for two radio signals is $$L_{12} = 20 \log(f_2/f_1) \quad (2)$$

where $f_1$ and $f_2$ are defined frequencies for two channels. Thus, higher frequency signals suffer from a larger path loss. Note that, since frequency and wavelength are inversely proportional, the relationships described herein can be converted to ones that are described using wavelength, using known techniques. For the purposes of this document, a wideband wireless communication system is one for which $L_{12}$ is significant, which is assumed to be 2 db or more. Thus, a wideband wireless communication is assumed to be one for which $f_2/f_1$ is greater than about 1.26. $L_{12}$ is also called the relative frequency path loss herein, to distinguish it from relative signal loss performance characteristics that are not based on the defined frequencies of two channels, be they relative or absolute. It should be further noted that the relative frequency path loss for two channels under consideration may be determined directly by equation (2) above or may be determined as the difference in path losses of each of two channels determined by equation (2) using a defined reference channel, such as the lowest frequency channel in a wide band system as $f_1$. For a single channel, the relative frequency path loss is the path loss of the channel determined by equation (2) using a defined reference channel. A center frequency (as determined by the average of the upper and lower band edges) may be used as the defined frequency for a channel in many instances, but it should be noted that the center frequency of a channel is but one channel reference that might be used in the path loss equation (2). For example, using a band edge frequency would provide nearly the same results in reasonably wide bands having channels that do not widely vary in their bandwidths. Other defined channel frequencies could be a geometric combination of band-edge frequencies. Thus, although the center frequency may be used most often to characterized the channel, the term channel frequency is used below to include other possible reference frequencies.

Although the actual path losses in a wideband communication system due to differences in channel frequencies may not follow the free space model, the path loss due to differences in channel frequencies will typically still follow the inverse relationship of the channel frequencies. The embodiments of the present invention described below utilize this characteristic to provide unique benefits in wideband wireless communication systems.

Referring to FIG. 1, a diagram of a wideband wireless communication system 100 is shown, in accordance with some embodiments of the present invention. This wideband wireless communication system 100 is a personal area network, or piconet, which in this example comprises communication system devices that include four communication units (CUs) 105 named CU1, CU2, CU3, and CU4, and an access point (AP) 110 that all transmit at low power levels that are appropriate only for short ranges. In this example, the distance of CUs 105 from the access point 110 are, in order of increasing distance, CU2, CU4, CU1, CU3. The CUs 105 may include, but are not limited to, wirelessly controlled entertainment devices, home utility devices, intra-home communication devices, and personal data units.

Figure 2:
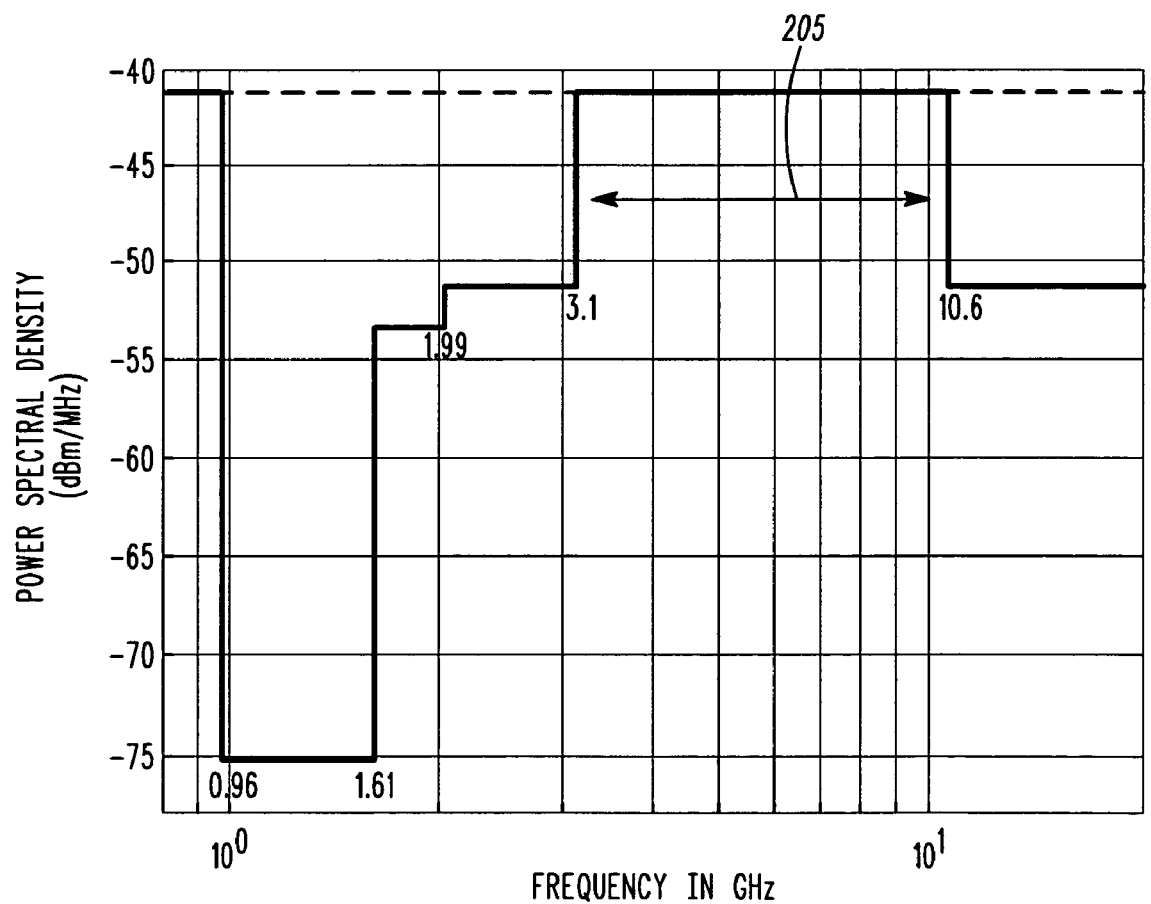
FIG. 2 is a frequency spectrum diagram, in accordance with some embodiments of the present invention.

Referring to FIG. 2, a frequency spectrum diagram is shown, in accordance with some embodiments of the present invention. An Ultra Wide Band system band is proposed for the purpose of short range piconets that would have channels within a frequency band 205 from 3.1 GHz to 10.6 GHz. As shown in FIG. 2, the power spectral density limit in this band for this purpose is −41.2 dBm/MHz. Using equation (2), the relative frequency path loss in this system when the band has 15 channels is 8.6 dB. When four channels are available to be assigned, or re-assigned, for the CUs 105 at these distances, and when other relative signal loss parameters were equal for all CUs 105, then it may be beneficial to assign the lower frequencies to the CUs that are at longer distances from the AP 110. This assignment technique tends to equalize the performance for the units, thereby optimizing the throughput in the wideband wireless communication system 100. For the example in which the 3.1 GHz to 10.6 GHz band is broken into 15 channels, a ratio of distances of a farthest communication unit to a nearest communication unit of about 2.7 can provide equal frequency path losses when the channel having the lowest and highest channel frequencies are assigned, respectively, and other losses are equal. When more channels are available than there are active CUs needing channels to be assigned, then improved system performance may be obtained by using the lowest four frequency channels that are available, with the ordering of frequency versus distance as just described. The caveat given above was that other relative signal loss parameters were equal. A variety of other relative signal loss parameters exist, including, but not limited to, a selectable transmit power spectral density used to communicate the signal, a selectable signaling sensitivity of the information being communicated with each CU 105 and selectable receiver diversity antenna gain (or any other antenna gain). Selectable signaling sensitivity as used herein is meant to refer to modifying any signaling related parameters, including, but not limited to data rates, information content, encoding schemes and modulation schemes, that are used in any manner on a frequency channel that can be characterized as having relative signaling sensitivities. This would include modulation techniques that use amplitude frequency, phase or polarization and all types of information redundancy used to control errors, and includes signaling techniques of varying bandwidth. When these relative signal loss parameters are equal for all CUs 105 in the inbound direction, and also equal for all CUs 105 in the outbound direction (but not necessarily the same as those in the inbound direction), then the same desired order of channel assignment pertains to both directions. When these other relative signal loss parameters are not equal for all CUs 105 in either or both of the inbound and outbound directions, then the order relationship stated above may be altered by the other relative signal loss parameters. In this event a calculated relative frequency path loss can be used in combination with the other relative signal loss parameters as the basis for determining channel assignments. Some examples of modifying other relative signal loss parameters in conjunction with the relative frequency related path loss are described further herein, below.

Figure 3:
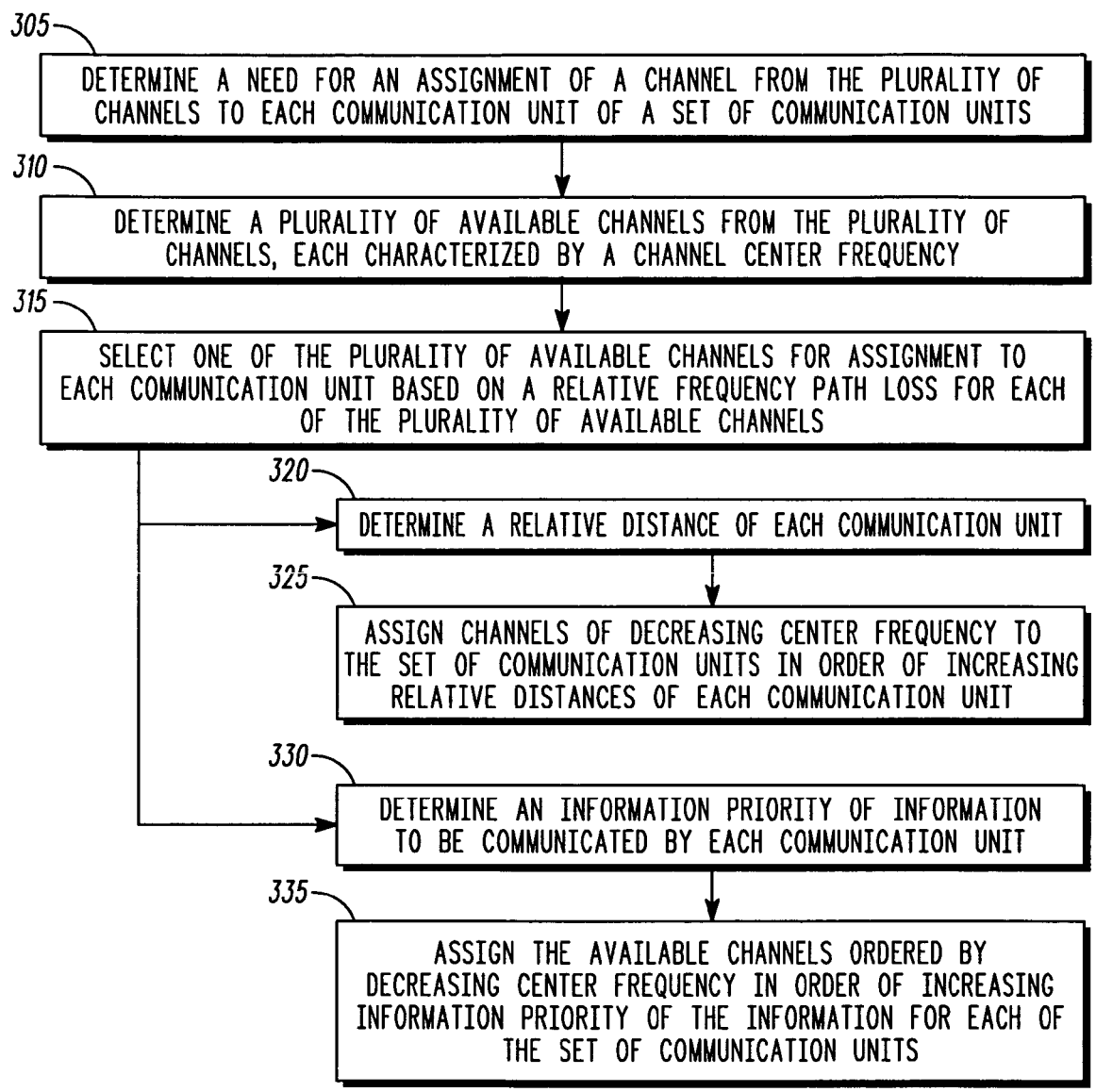
FIG. 3 is a flow chart showing a communication method used in a wideband wireless communication system comprising a plurality of channels, in accordance with some embodiments of the present invention.

Referring to FIG. 3, a flow chart of a communication method used in a controller of a wideband wireless communication system comprising a plurality of channels is shown, in accordance with some embodiments of the present invention. Each of the plurality of frequency channels is characterized by a channel frequency. At step 305, a need for an assignment of a channel from the plurality of channels to each communication unit of a set of active communication units is determined. A plurality of available channels is then determined at step 310 from the plurality of channels, each characterized by a channel frequency. Conventional techniques may be used for steps 305 and 310. One of the plurality of available channels is selected at step 315 for assignment to each communication unit based on a relative frequency path loss based on channel frequency for each of the plurality of available channels. In this method, when the quantity of communication units in the set of active communication units for which a channel assignment is needed is less than a number of unused channels (or channels that are used but have lower priority traffic), the set of available channels may be made up of a subset of the unused or lower priority channels that have the lowest channel frequencies. (The size of the subset is made equal to the size of the set of communication units.) On the other hand, if a quantity of available channels is less than the number of communication units for which channel assignments are sought, the number of number of communication units may be reduced or the number of channels for assignment may be increased. For example, the last active communication units seeking channel assignment may be removed from the set, or communication units having lower priority information to transfer may be removed from the set. Or, the number of channels may be increased to the number of communication units needing channels assigned by using channels having narrower bandwidths than originally assumed. In another variation, some channels may be designated as reserved channels that are used only as channels to be used for assignment under circumstances described herein. At step 320, a relative distance of each communication unit 105 is determined, and at step 325 the set of communication units are assigned channels of decreasing channel frequency in order of increasing relative distances of each communication unit 105. The example described with reference to FIG. 1 is an example of this step. One method of obtaining relative distances is using global positioning system (GPS) distances obtained by each CU105. For systems in which the communication units are typically so close that the GPS positions of two units are less than the resolution of the GP system, another approach can be used for relative distance determination, such as an angle of arrival method, using a plurality of angles of arrival determined at the communication units 105 and the access point 110.

Another method that relies on the relative frequency path loss of each of a plurality of available channels is one in which an information priority is determined at step 330 for information that is to be communicated by each communication unit and the available channels, ordered by decreasing channel frequency, are assigned at step 335 in order of increasing information priority of the information for each of the set of communication units.

Figure 4:
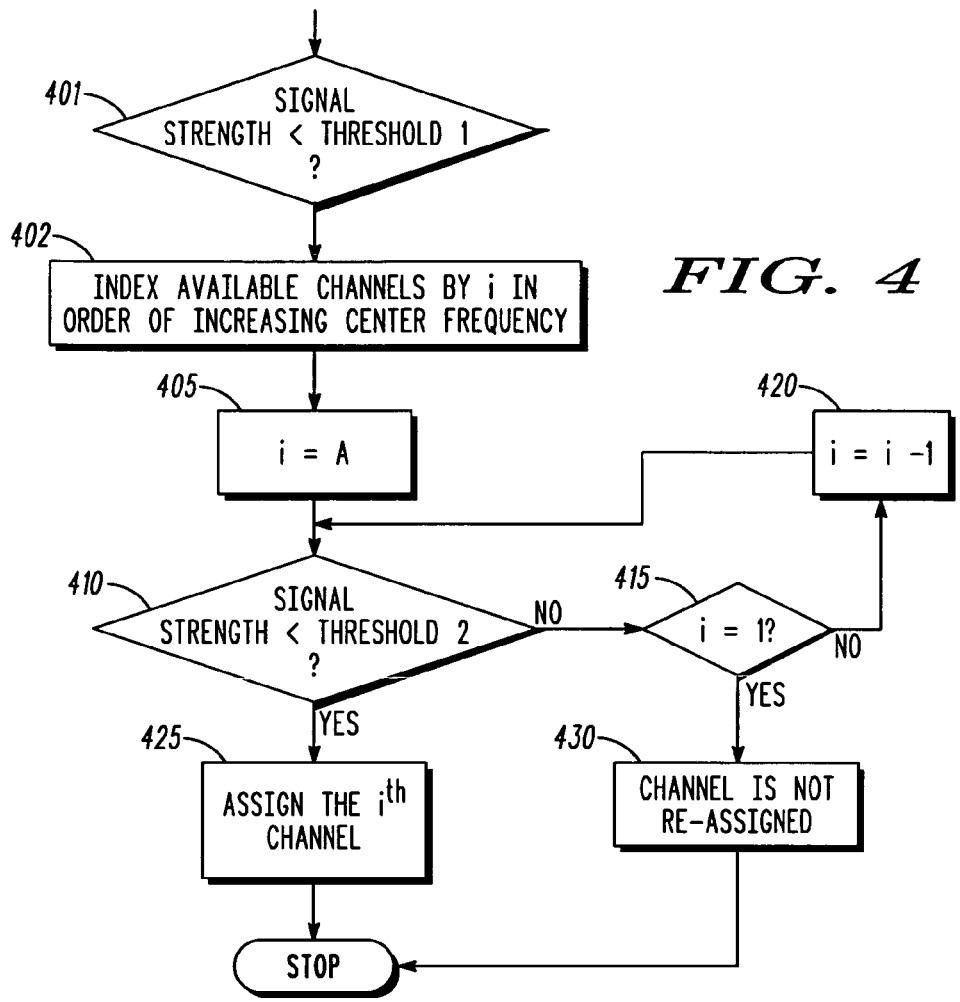
FIG. 4 is a flow chart showing a selecting step for a communication unit of the wideband wireless communication system is shown, in accordance with some embodiments of the present invention.

Referring to FIG. 4, a flow chart of the selecting step 315 (FIG. 3) for the communication unit 105 is shown, in accordance with some embodiments of the present invention. These are alternative approaches that rely on the relative frequency path loss of each of a plurality of available channels, which may be useful when distances are not known to the communication units 105 being assigned channels, but a current received signal strength measurement is known for them (i.e., they are presently assigned to a channel or can measure a global signal such as a pilot signal). The method begins at step 401, when the received signal strength measurement indicates that the received signal strength is determined to below a threshold, which is identified in FIG. 4 as a first threshold. At step 402 the available channels are indexed by i in order of increasing channel frequency. At step 405, a channel index, i, is set to A, which identifies the highest frequency available channel having the highest channel frequency. At step 410, a test is made to determine whether the signal strength that is measured using the $i^{th}$ channel is higher than a second threshold. When it is not, a determination is made at step 415 as to whether there are any more available channels left to test. When there are none, no re-assignment is made at step 430. When there are channels left to test at step 415, i is reduced by 1 at step 420, and at step 410 the test is now made using the available channel having the next lower channel frequency. When at step 410, an available channel is found for which the signal strength is measured to be above a second threshold, the available channel being tested is assigned to the communication unit 105. Variations of the above unique method that provide the same result would now be obvious to one of ordinary skill in the art. For example, the search could start at channel of low frequency rather than high frequency.

The example described with reference to FIG. 4 may be summarized as follows. When a received signal strength on a first channel used by a communication unit is measured to be below a threshold, the communication unit is re-assigned a second channel having a lower channel frequency than the channel frequency of the first channel. Ultimately, the communication unit 105 is assigned a channel that has the highest channel frequency at which the received signal strength is above the second threshold. It will be appreciated that a communication unit just entering the system can be initially assigned a channel using the same method except for step 401, so a description that the communication unit 105 is assigned the channel having the highest channel frequency at which the received signal strength of the channel is above a defined threshold fits both cases quite well.

Consider now an example of a dual band system that would be a Local Area Network (LAN) system that is designed to meet two specifications promulgated by the Institute of Electrical and Electronic Engineers, IEEE 802.11a and IEEE 802.11.g. Such a system could assign users channels in a 2.4 GHz band or a 5.25 GHz UNII band, respectively. Different maximum power spectral densities are specified for transmissions in each band. The total relative path and signal loss based on only the frequency and power spectral density parameters (using a free space assumption) is determined by $$L=20 \log(f_2/f_1)+10*\log 10(P_1/P_2) \quad (3)$$

where $P_1$ and $P_2$ are the PSD (power spectral density) of the first and second channels, respectively. The maximum power densities specified for the 2.4 GHz and 5.25 GHz band are 200 and 2.5 milliwatts/Hertz, respectively. For these values, the relative path and signal losses are approximately $$L=20 \log(5.45/2.4)+10*\log 10(200/2.5) \approx 26 \text{ dB} \quad (4)$$

By assigning channels in one or the other of these bands, considerable differences in signaling performance can be accommodated. This may be an extreme example, but the principle holds for other systems in which the power spectral density is not the same in all channels. This method may be generally stated as the one described with reference to steps 305-315 in FIG. 3, but wherein 1) each channel of the plurality of channels has a power spectral density of $P_i$, wherein the subscript i identifies an $i^{th}$ channel, and 2) wherein the relative frequency path loss is based on the channel frequency and the channel bandwidth by the relationship $L=20 \log (f_R/f_i)+10 \log (P_i/P_R)$, for which L is the relative frequency path loss, $f_R$ is the channel frequency of a defined reference channel of the plurality of available channels, and $f_i$ is the channel frequency of the $i^{th}$ channel of the plurality of available channels.

The use of power spectral density is but one example of basing a channel assignment on a calculation of the frequency related and other relative signal loss parameters. This calculation may be stated more generally as $$L=20 \log(f_2/f_1)+\text{Other Relative Signal Losses} \quad (5)$$

wherein the other relative signal loss parameters can include, but are not limited to, such things as the power spectral density, signaling performance, and antenna gain. It will be appreciated that when other types of path or signal losses are used for selecting a channel, a calculation of the type given in equation (5) may be the most practical way to combine the effects of the parameters to make the selection. The calculation could involve table lookups. In a situation in which the other relative signal loss parameters are equal, the calculation for relative frequency path loss given by equation (2) may be used, but an ordering approach simply based on the channel frequencies, as described above with referenced to FIGS. 3 and 4, may be simpler. It will be further appreciated that the methods described with reference to FIG. 4 work well when only one communication unit needs a channel assigned, so it may be said that the set of communication units described in step 305 may be as few as one communication unit.

Figure 5:
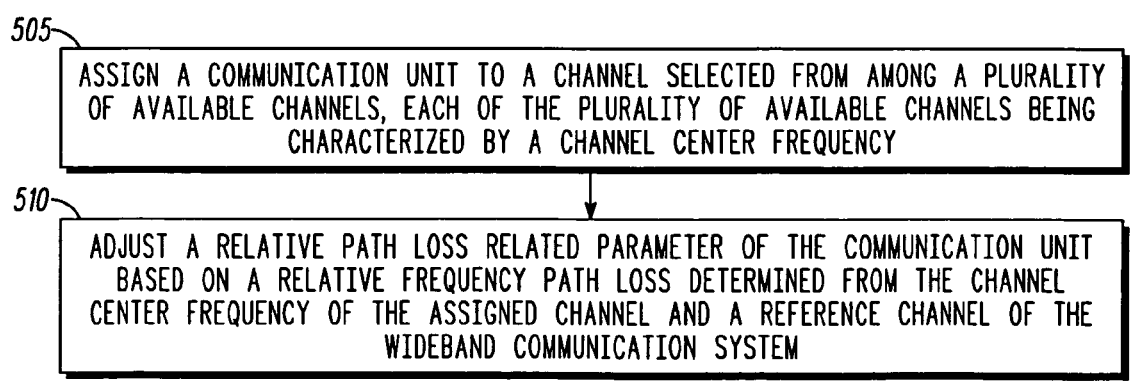
FIGS. 5-7 are flow charts showing a communication method used in a wideband wireless communication system comprising a plurality of channels, in accordance with some embodiments of the present invention.

Referring to FIG. 5, a flow chart of a communication method used in a wideband wireless communication system comprising a plurality of channels is shown, in accordance with some embodiments of the present invention. At step 505, a communication unit 105 is assigned a channel selected from among a plurality of available channels. Each of the plurality of available channels is characterized by a channel frequency. At step 510, a relative signal loss parameter of the communication unit is adjusted, wherein the adjustment is based on a relative frequency path loss determined from the channel frequency of the assigned channel and a reference channel of the wideband communication system. An example of this is a system in which a communication unit is assigned a new channel based on considerations that may not include the effect of relative frequency path loss, but within which a path loss related parameter (such as a signaling technique) is then adjusted to compensate for the relative frequency path loss incurred by the channel change. It will be appreciated that the adjustment may be done using design techniques that may be based on measurements or calculations of magnitudes of path losses caused by changes of the path loss related parameters and calculations of the relative frequency path loss for each channel relative to a defined channel, but for which the results are embodied as tables or thresholds in a real time technique used to perform the adjustments. Such table or threshold techniques are therefore based on a relative frequency path loss determined from the channel frequency of the assigned channel and a reference channel of the wideband communication system. In effect, the relative frequency path loss can be used in combination with or independently from other methods to improve a communication for a communication unit. When a real time calculation is used for the relative frequency path loss, the reference channel may be the current channel instead of a defined channel.

Figure 6:
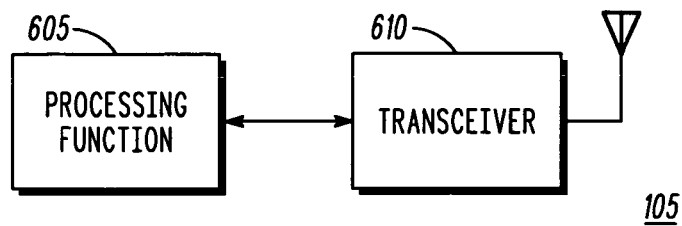

Referring to FIG. 6, an electrical block diagram is shown of a communication unit 105, in accordance with some embodiments of the present invention. One aspect of the method described with reference to FIG. 5 is that it lends itself to implementation solely within a communication unit 105 that comprises a processing function 605 for performing the steps of assigning 505 and adjusting 510, and a radio transceiver 610 for transmitting information using the assigned channel.

Figure 7:
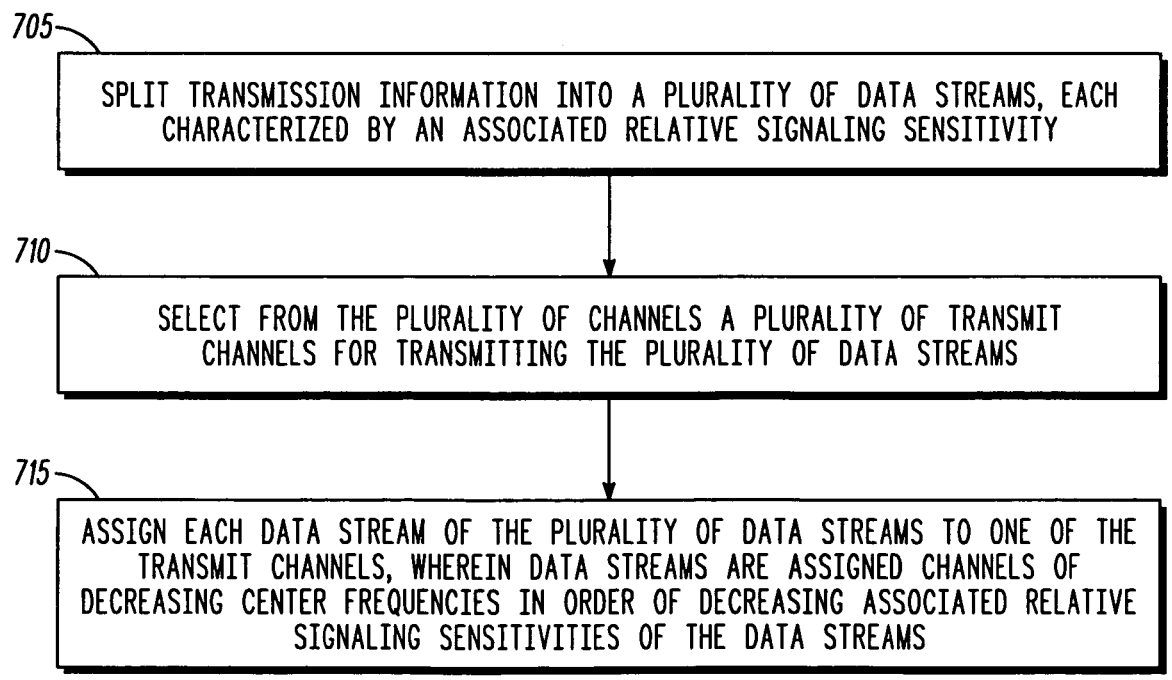

Referring to FIG. 7, a flow chart of a communication method used in a wideband wireless communication system comprising a plurality of channels is shown, in accordance with some embodiments of the present invention. At step 705, transmit information intended for one destination unit is split into a plurality of data streams. Each data stream is characterized by an associated relative signal loss (such as relative signaling sensitivity). A plurality of available transmit channels are selected at step 710 (from the plurality of channels) for transmitting the plurality of data streams. Each data stream of the plurality of data streams is then assigned to one of the available transmit channels at step 715. The data streams are assigned channels of decreasing channel frequencies in order of increasing associated relative signaling sensitivities of the data streams. Increased signaling sensitivity for this purpose means that increased received signal strength is required to achieve a standard performance criteria, such as one error per 10,000 recovered bits.

It will be appreciated the communication system devices comprising the access point and communication units described herein may be comprised of one or more conventional processors and unique stored program instructions that control the one or more processors to implement, in conjunction with certain non-processor circuits, some of the functions of the communication system devices described herein. The non-processor circuits may include, but are not limited to, a radio receiver, a radio transmitter, signal drivers, clock circuits, power source circuits, and user input devices. As such, these functions have largely been interpreted as steps of a method to perform the functions of communication system devices. Alternatively, some or all functions could be implemented by a state machine that has no stored program instructions, in which each function or some combinations of certain of the functions are implemented as custom logic. Of course, a combination of the two approaches could be used. Thus, means as well as methods for performing these functions have been described herein.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

It is further understood that the use of relational terms, if any, such as first and second, top and bottom, and the like may be used solely to distinguish one entity or action from another entity or action without necessarily requiring or implying any actual such relationship or order between such entities or actions.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

A "set" as used herein, means a non-empty set (i.e., for the sets defined herein, comprising at least one member). The term "another", as used herein, is defined as at least a second or more. The terms "including" and/or "having", as used herein, are defined as comprising. The term "coupled", as used herein with reference to electro-optical technology, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, an executable application, an applet, a servlet, a source code, an object code, a shared library/dynamic load library and/or other sequence of instructions designed for execution on a computer system.

What is claimed is:

1. A communication method used in a controller of an ultra wideband wireless communication system comprising a plurality of channels, each characterized by a channel frequency, comprising:

determining a need for an assignment of a channel from the plurality of channels to each communication unit of a set of communication units;

determining a plurality of available channels from the plurality of channels; and selecting one of the plurality of available channels for assignment to each communication unit based on a relative frequency path loss for each of the plurality of available channels;

determining an information priority of information to be communicated by each communication unit; and assigning the available channels ordered by decreasing channel frequency in order of increasing information priority of the information for each of the set of communication units.

2. The method according to claim 1, wherein the selecting further comprises:

determining a relative distance of each communication unit, and assigning channels of decreasing channel frequency to the set of communication units in order of increasing relative distances of each communication unit.

3. The method according to claim 1, wherein selecting further comprises measuring a received signal strength that is below a threshold on a first channel used by a communication unit; and assigning the communication unit a second channel having a lower channel frequency than the channel frequency of the first channel.

4. The method according to claim 1, wherein the selecting further comprises assigning the communication unit a channel having a highest channel frequency at which a received signal strength of the channel exceeds a defined threshold.

5. The method according to claim 1, wherein the wideband wireless communication system has a range of channel frequencies that has ratio of at least 1.26 to 1.

6. The method according to claim 1, wherein the relative frequency path loss for an $i^{th}$ channel of the plurality of channels is determined as $L=20 \log (f_R/f_i)$, for which L is the relative frequency related path loss, $f_R$ is the channel frequency of a defined reference channel of the plurality of available channels, and $f_i$ is the channel frequency of the $i^{th}$ channel of the plurality of available channels.

7. The method according to claim 1, wherein each channel of the plurality of channels has a power spectral density of $P_i$, wherein the subscript i identifies an $i^{th}$ channel, and wherein the relative frequency path loss is based on the channel frequency and the channel bandwidth by the relationship $L=20 \log (f_R/f_i)+10 \log (P_i/P_R)$, for which L is the relative frequency path loss, $f_R$ is the channel frequency of a defined reference channel of the plurality of available channels, and $f_i$ is the channel frequency of the $i^{th}$ channel of the plurality of available channels.

8. A communication method used in an ultra wideband wireless communication system, comprising:

assigning a communication unit to a channel selected from among a plurality of available channels, each of the plurality of available channels being characterized by a channel frequency wherein assigning a communication unit to a channel includes determining an information priority of information to be communication by the communication unit and assigning the channel ordered by decreasing channel frequency in order of increasing information priority of the information; and adjusting a relative signal loss parameter of the communication unit based on a relative frequency path loss determined from the channel frequency of the assigned channel and a reference channel of the ultra wideband wireless communication system.

9. The method according to claim 8, wherein the relative signal loss parameter of the communication unit is one or more of selectable transmit power spectral density, signaling sensitivity, and antenna gain.

10. The method according to claim 8, wherein the ultra wideband communication system has a range of channel frequencies that has ratio of at least 1.26 to 1.

11. The method according to claim 8, wherein the method is used within a communication unit of the ultra wideband communication system that comprises a processing unit for performing the assigning and adjusting, and a radio transceiver that transmits information on the assigned channel.

12. The method according to claim 8, wherein the reference channel is a current channel that the communication unit was most recently using for communicating, and wherein the determining comprises modifying the at least one communication parameter from the value used for the current channel to compensate for the relative frequency path loss of the new channel with reference to the current channel.

13. A communication unit for an ultra wideband wireless communication system, the communication unit comprising:

a radio capable of operating on one or more of a plurality of channels, each characterized by a channel frequency; and a processing function that determines an assignment of the communication unit to a new channel of the plurality of channels;

determines at least one communication parameter based on a relative frequency path loss determined from the channel frequency of the new channel and a reference channel of the wideband communication system;

determines an information priority of information to be communication by the communication unit; and and assigns the channel ordered by decreasing channel frequency in order of increasing information priority of the information.

14. A communication method used in a controller of a wideband wireless communication system comprising a plurality of channels, each characterized by a channel frequency, comprising:

determining a need for an assignment of a channel from the plurality of channels to each communication unit of a set of communication units;

determining a plurality of available channels from the plurality of channels; and selecting one of the plurality of available channels for assignment to each communication unit based on a relative frequency path loss for each of the plurality of available channels, and wherein the relative frequency path loss for an $i^{th}$ channel of the plurality of channels is determined as $L=\mathbf{20} \log (f_R/f_i)$, for which L is the relative frequency related path loss, $f_R$ is the channel frequency of a defined reference channel of the plurality of available channels, and $f_i$ is the channel frequency of the $i^{th}$ channel of the plurality of available channels.

15. A communication method used in a controller of a wideband wireless communication system comprising a plurality of channels, each characterized by a channel frequency, comprising:

determining a need for an assignment of a channel from the plurality of channels to each communication unit of a set of communication units;

determining a plurality of available channels from the plurality of channels; and selecting one of the plurality of available channels for assignment to each communication unit based on a relative frequency path loss for each of the plurality of available channels, and wherein each channel of the plurality of channels has a power spectral density of $P_i$, wherein the subscript i identifies an $i^{th}$ channel, and wherein the relative frequency path loss is based on the channel frequency and the channel bandwidth by the relationship $L=20 \log (f_R/f_i)+10 \log (P_i/P_R)$, for which L is the relative frequency path loss, $f_R$ is the channel frequency of a defined reference channel of the plurality of available channels, and $f_i$ is the channel frequency of the $i^{th}$ channel of the plurality of available channels.

16. A communication method used in a controller of an ultra wideband wireless communication system comprising a plurality of channels, each characterized by a channel frequency, comprising:

determining a need for an assignment of a channel from the plurality of channels to each communication unit of a set of communication units;

determining a plurality of available channels from the plurality of channels; and determining an information priority of information to be communicated by each communication unit; and assigning one of the plurality the available channels ordered to each communication unit based on one of a relative frequency path loss and a decreasing channel frequency in order of increasing information priority of the information for each of the set of communication units.

17. The method according to claim 16, wherein the selecting further comprises:

determining a relative distance of each communication unit, and assigning channels of decreasing channel frequency to the set of communication units in order of increasing relative distances of each communication unit.

18. The method according to claim 16, wherein selecting further comprises measuring a received signal strength that is below a threshold on a first channel used by a communication unit; and assigning the communication unit a second channel having a lower channel frequency than the channel frequency of the first channel.

19. The method according to claim 16, wherein the selecting further comprises assigning the communication unit a channel having a highest channel frequency at which a received signal strength of the channel exceeds a defined threshold.

20. The method according to claim 16, wherein the wideband wireless communication system has a range of channel frequencies that has ratio of at least 1.26 to 1.

21. The method according to claim 16, wherein the relative frequency path loss for an $i^{-th}$ channel of the plurality of channels is determined as $L=20 \log (f_R/f_i)$, for which L is the relative frequency related path loss, $f_R$ is the channel frequency of a defined reference channel of the plurality of available channels, and $f_s$ is the channel frequency of the $i^{-th}$ channel of the plurality of available channels.

22. The method according to claim 16, wherein each channel of the plurality of channels has a power spectral density of $P_i$, wherein the subscript i identifies an $i^{-th}$ channel, and wherein the relative frequency path loss is based on the channel frequency and the channel bandwidth by the relationship $L=20 \log (f_R/f_i) +10 \log (P_i/P_R)$, for which L is the relative frequency path loss $f_R$ is the channel frequency of a defined reference channel of the plurality of available channels, and $f_i$ is the channel frequency of the $i^{-th}$ channel of the plurality of available channels.

* * * * *